United States Patent
Chandra (10) Patent No.: US 9,519,919 B2
(45) Date of Patent: Dec. 13, 2016

(54) IN-STORE ADVERTISEMENT CUSTOMIZATION

(71) Applicant: PayPal, Inc., San Jose, CA (US)

(72) Inventor: Prakash Chandra, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/643,982

(22) Filed: Mar. 10, 2015

(65) Prior Publication Data

US 2016/0267552 A1    Sep. 15, 2016

(51) Int. Cl.
*G06K 15/00* (2006.01)
*G06F 17/00* (2006.01)
*G06Q 30/02* (2012.01)

(52) U.S. Cl.
CPC ...... *G06Q 30/0276* (2013.01); *G06Q 30/0255* (2013.01); *G06Q 30/0261* (2013.01)

(58) Field of Classification Search
USPC .................. 235/375, 380, 383, 385
See application file for complete search history.

(56) References Cited

U.S. PATENT DOCUMENTS

| | | | | |
|---|---|---|---|---|
| 2007/0192183 A1* | 8/2007 | Monaco | ................. | G06Q 30/02 705/14.25 |
| 2012/0046044 A1* | 2/2012 | Jamtgaard | ............. | G01S 3/7864 455/456.1 |
| 2013/0246175 A1* | 9/2013 | Bilange | .................. | H04L 67/20 705/14.53 |
| 2014/0006165 A1* | 1/2014 | Grigg | ................. | G06Q 30/0207 705/14.64 |
| 2015/0112826 A1* | 4/2015 | Crutchfield, Jr. | .. | G06Q 30/0601 705/26.1 |
| 2015/0134429 A1* | 5/2015 | Katakwar | .......... | G06Q 30/0207 705/14.1 |

* cited by examiner

*Primary Examiner* — Tuyen K Vo
(74) *Attorney, Agent, or Firm* — Haynes and Boone, LLP (57) ABSTRACT

A system or method is provided to detect and check-in a user at a merchant's store. The system may retrieve the user's preferences and may customize advertisements and/or promotions based on the user's preferences. The customized advertisements may then be presented or displayed to the user as the user browses or shops in the merchant's store. In particular, the customized advertisements may be selected or generated based on the user's transaction history, browsing history, purchase history, pre-defined preferences, and the like. In an embodiment, the system may detect and check-in multiple users at a merchant's location. The system may select or generate advertisements based on multiple users who are visiting the merchant.

20 Claims, 6 Drawing Sheets

IN-STORE ADVERTISEMENT CUSTOMIZATION

BACKGROUND

Field of the Invention

The present invention generally relates to systems and methods for implementing in-store advertisement customization.

Related Art

Merchants typically display advertisements at physical store locations to attract customers' attention or to incentivize customers to visit. Traditional advertisement displays are static and may not be applicable or appropriate to all customers who visit the store. Thus, it may be difficult for the advertisements to capture the attention of all types of customers or visitors. Further, static advertisements may include general contents in an attempt to cover a majority of customers. However, the general contents may not have good results for lack of specificity. Thus, there is a need for a system or method that customizes in-store advertisements to better attract and incentivize customers.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a system or method is provided to detect and check-in a user at a merchant's store. The system may retrieve the user's preferences and may customize advertisements and/or promotions based on the user's preferences. The customized advertisements may then be presented or displayed to the user as the user browses or shops in the merchant's store. In particular, the customized advertisements may be selected or generated based on the user's transaction history, browsing history, purchase history, pre-defined preferences, and the like.

In an embodiment, the system may detect and check-in multiple users at a merchant's location. The system may select or generate advertisements based on multiple users who are visiting the merchant. In particular, the system may analyze and consider preferences from multiple users to customize the promotions or offers presented to the users. Further, the preferences from different users may be weighted differently based on the user's importance and/or priority. For example, users who are frequent customers may be weighted more, such that the in-store advertisements are customized to target the more frequent customers.

In an embodiment, the system may detect and check-in users and may determine user restrictions, such as age restrictions. As such, the advertisements may be filtered to remove inappropriate contents and appropriate promotions and/or offers may be presented or displayed to the users who have certain restrictions. For example, advertisements for alcoholic beverages may be removed from the advertisements when underage users are visiting the merchant's store or in front of an advertisement display.

In some embodiments, the system may monitor a user's movement in a merchant's store. In particular, the location and movement of the consumer in the merchant's store may be monitored by detecting a location of the consumer's mobile device via Bluetooth Low Energy (BLE) communication using a network of BLE devices, such as beacons, positioned throughout the merchant's store. Based on the BLE signals detected at the consumer's mobile device, the location of the consumer in the store may be determined by triangulation and by referencing the designated positions of the BLE beacons that emits the BLE signals. Thus, advertisements may be presented to the user based on the user's location in the merchant's store. For example, the merchant's store may have multiple displays for promotions and offers. As such, the multiple displays may present different advertisements to different users simultaneously based on the users' locations.

In some embodiments, the advertisements may be visual displays, such as images, moving pictures, color scheme, and the like. The advertisement may also include audio presentations, such as music, infomercial, audio broadcast, and the like. In an embodiment, offers and/or prices may be customized and displayed at a product based on the customer's preferences and status. In some embodiments, the advertisements may include offers or promotions to entice customers to visit nearby merchants. As such, the advertisement space in one merchant's store may be utilized by another merchant to advertise to customers.

In some embodiments, the advertisements may be customized based on the context, environmental factors, trend, and the like. In particular, the advertisements may be customized based on the time of the day, season of the year, and the like, particular to the detected user(s). For example, the user is shopping at a store and lunch time is approaching, the system may generate promotions or offers for nearby restaurants and may present lunch promotions or offers specific to the user at the store, such as known food items or restaurants of interest to the user.

Figure 1:
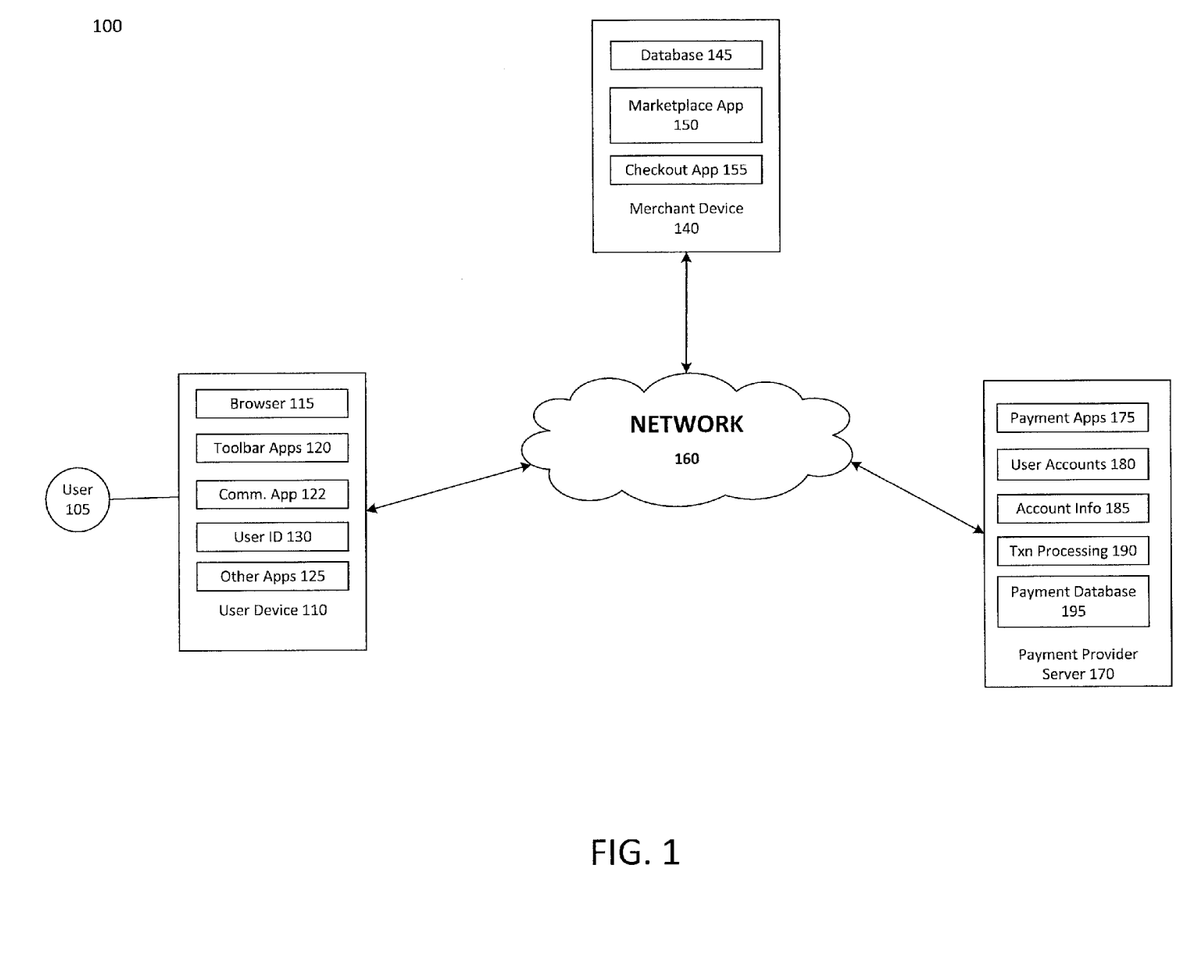
FIG. 1 is a block diagram of a networked system suitable for implementing in-store advertisement customization according to an embodiment.

FIG. 1 is a block diagram of a networked system 100 suitable for implementing in-store advertisement customization according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchant server 140, and a payment provider server 170 in communication over a network 160. Payment provider server 170 may be maintained by a payment service provider, such as PayPal, Inc. of San Jose, Calif. A user 105, such as a sender or consumer, utilizes user device 110 to perform a transaction using payment provider server 170. User 105 may utilize user device 110 to initiate a payment transaction, receive a transaction approval request, or reply to the request. Note that transaction, as used herein, refers to any suitable action performed using the user device, including payments, transfer of information, display of information, etc. For example, user 105 may utilize user device 110 to initiate a deposit into a savings account. Although only one merchant server is shown, a plurality of merchant servers may be utilized if the user is purchasing products or services from multiple merchants.

In some embodiments, user device 110 may download a shopping application from payment provider server 170 or from merchant server 140. The shopping application may allow user 105 to compose shopping lists listing items to be purchased at the merchant's store. The user 105 also may use the shopping application to check in at the merchant's store when the user 105 visits the store. The user 105's presence at the store may be detected by various wireless techniques, such as by GPS location technique, Bluetooth communication, Near-Field Communication (NFC), or the like.

User device 110 may include a Bluetooth device configured to implement low energy Bluetooth communication. A network of low energy Bluetooth beacons may be installed at various locations inside the merchant's store. Thus, the location and movements of user device 110 in the merchant's store may be determined by detecting the various Bluetooth beacons installed in the merchant's store. When user 104 utilizes the shopping application on user device 110 to purchase items on a shopping list, the locations and movements of user 104 in the merchant's store may be monitored.

User device 110, merchant server 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, wearable device, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise utilize a smart wallet through the payment provider as discussed above. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 may include location detection device, such as GPS system and the like. Further, user device 110 may include a Bluetooth device configured to implement low energy Bluetooth (BLE) communication. For example, user device 110 may detect various low energy Bluetooth signals from Bluetooth beacons installed in a merchant's store. Thus, locations and movements of user device 110 may be determined by positioning techniques, such as triangulation or location fingerprinting.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes individuals as well as banks and retailers. For example, a payment made to a person or a deposit to a saving account. Merchant server 140 may include a database 145 identifying available products (including digital goods) and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Merchant server 140 may be connected to a network of Bluetooth beacons installed in the merchant's brick-and-mortar store. The network of Bluetooth beacons may be installed at respective locations throughout the merchant's store to form a grid. Each Bluetooth beacon may emit a low energy Bluetooth signal in specific frequency spectrum periodically. Thus, the network of Bluetooth may allow detection of locations and movements of consumer in the merchant's store. In some embodiments, merchant server 140 may maintain a database that stores shopping routes taken by consumers. The shopping routes may be routes taken by the consumers when browsing or shopping in the merchant's store.

Merchant server 140 also may be connected to a plurality of presentation devices, such as visual displays, audio broadcast devices, lightings, or other presentation devices configured to present promotions and/or offers to customers who are visiting the merchant's store. The presentation devices may be installed at various locations in the merchant's store, such as at the front of the store facing customers passing by, inside the stores near various products, at the beginning of aisle or departments, and the like. The presentation devices may be configured to communicate with the merchant server 140. As such, the merchant server 150 may communicate information for displaying advertisements to the presentation devices.

Payment provider server 170 may be maintained, for example, by an online payment service provider which may provide payment between user 105 and the operator of merchant server 140. In this regard, payment provider server 170 includes one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

In some embodiments, payment provider server 170 may maintain user history in the account information, such as user's browsing history, purchase history, communication history, and the like. In some embodiments, payment provider server 170 may have access to user's contact list, to-do list, calendar, and the like. Payment provider server 170 may utilize the account information to customize promotions or offers for the user. In an embodiment, payment provider server 170 may include an advertisement database storing various promotions or offers from various merchants. The payment provider server 170 may select and customize advertisements from the advertisement database to be presented to the user.

A transaction processing application 190, which may be part of payment application 175 or separate, may be configured to receive information from user device 110 and/or merchant server 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105, as well as create new accounts if necessary.

Figure 2A:
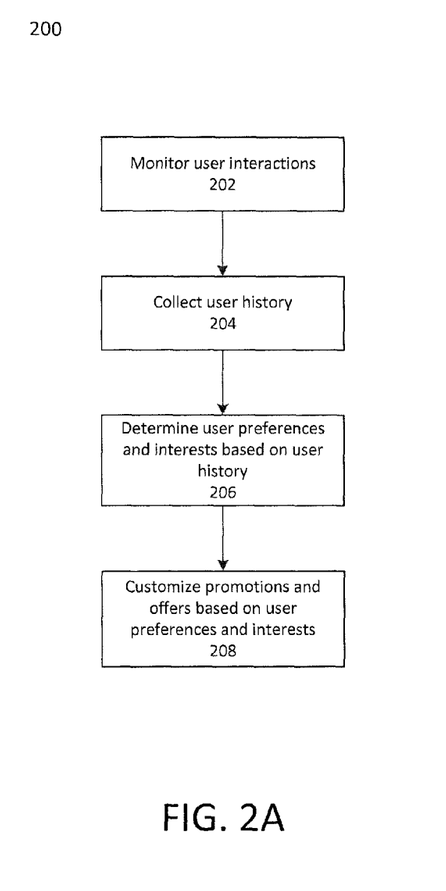
FIGS. 2A and 2B are flowcharts showing processes for setting up in-store advertisement customization according to one embodiment.
Figure 2B:
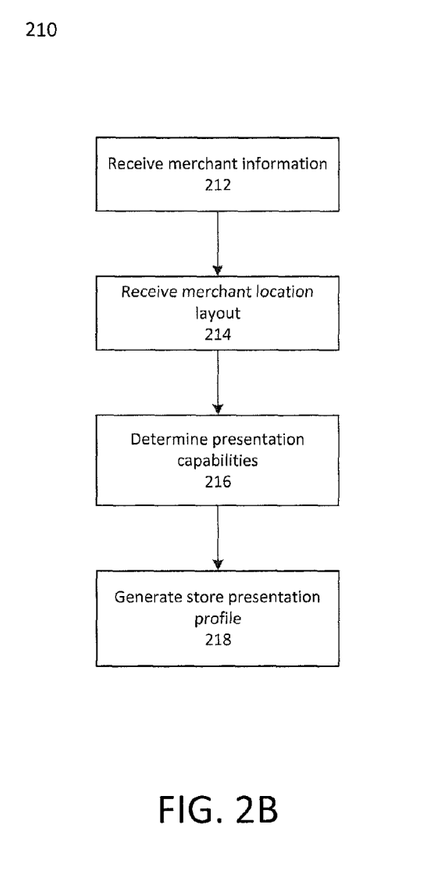

FIGS. 2A and 2B are flowcharts showing processes 200 and 210 for setting up in-store advertisement customization. In process 200, the user device 110, the merchant device 140, and/or the payment provider server 170 may monitor the user 105's interactions at step 202. The user 105's interactions may include making purchases, browsing or shopping online or at physical stores, communication with others, such as text messages, emails, and the like, calendar events, schedule appointments, social media postings, and the like. For example, based on the activities on the user device 110, the system may capture the user 105's interactions and location/movement as the user 105 operates the user device 110 and via the GPS or Bluetooth device on the user device 110. At step 204, the system may collect and store the monitored activities as part of the user history. The user history may be stored with the user 105's account. In some embodiments, the user history may be organized by activity type and in chronological order. The user history may continuously be updated to reflect the most recent activities of the user 105.

At step 206, the system may determine user 105's preferences and/or interests based on the collected user history. In particular, based on the user 105's transactions history, purchase history, browsing history, shopping history, and the like, the system may determine the user 105's interest or preferences for particular merchants, products, services, sports, entertainment, music, news, and the like. For example, based on the merchant or the type of merchant the user 105 visits or shops, the system may determine the type of products or services the user 105 prefers. In another example, based on the user 105's communication with other users and the user 105's internet browsing history, the system may determine that the user 105 is interested in purchasing certain products or services. In still another example, based on the user 105's calendar or social media posting, the system may determine that the user 105 has a birthday event coming up soon and may infer that the user 105 is interested in shopping for certain birthday related products or services, such as birthday cards or birthday party services.

In some embodiments, the system may use the user 105's attributes, such as gender, age bracket, household income bracket, education, resident location, social media followings, and other demographic information. The user 105 may provide information regarding the user 105's attributes to the merchant or from an external source, such as third party companies.

In some embodiments, the system may allow the user 105 to designate privacy settings on how the user 105's personal information may be used for target advertisement. For example, the user 105 may opt out of target advertisements using the user 105's behavioral data. The system may provide a link which may direct the user 105 to an interface or a web page that allow the user 105 to designate various privacy settings related to target advertisements.

At step 208, the system may determine or select promotions, ads, or offers based on the user 105's preferences or interests. For example, the system may notify the user 105 of certain promotions offered at merchants where the user 105 frequently shops. In another example, the system may suggest other merchants similar to the ones the user 105 frequently visits. In some embodiments, the system may customize the content of the advertisements, such as by inserting the user 105's name, adjusting the discount rate, inserting context information, selecting language style, and the like. The advertisements may include various forms, such as in visual form, audio form, textual form, and the like. The advertisements may be stored and ready to be presented to the user 105 at appropriate times and locations, as described below.

In process 210, the system may set up for in-store presentation of the customized advertisements. At step 212, user device 110 or payment provider server 170 may receive merchant information from various merchants or operators of public venues. For example, merchant information for grocery stores, retail stores, restaurants, food truck parks, museums, open air markets, such as flea markets or swap meets, or other public places visited by consumers may be received by user device 110 or payment provider server 170. The merchant information may include the name of the merchant or owner, the address, contact information, type of business, products or services offered, and other information related to the store. Payment provider server 170 may store the each merchant information in a database each with its own profile.

Figure 5:
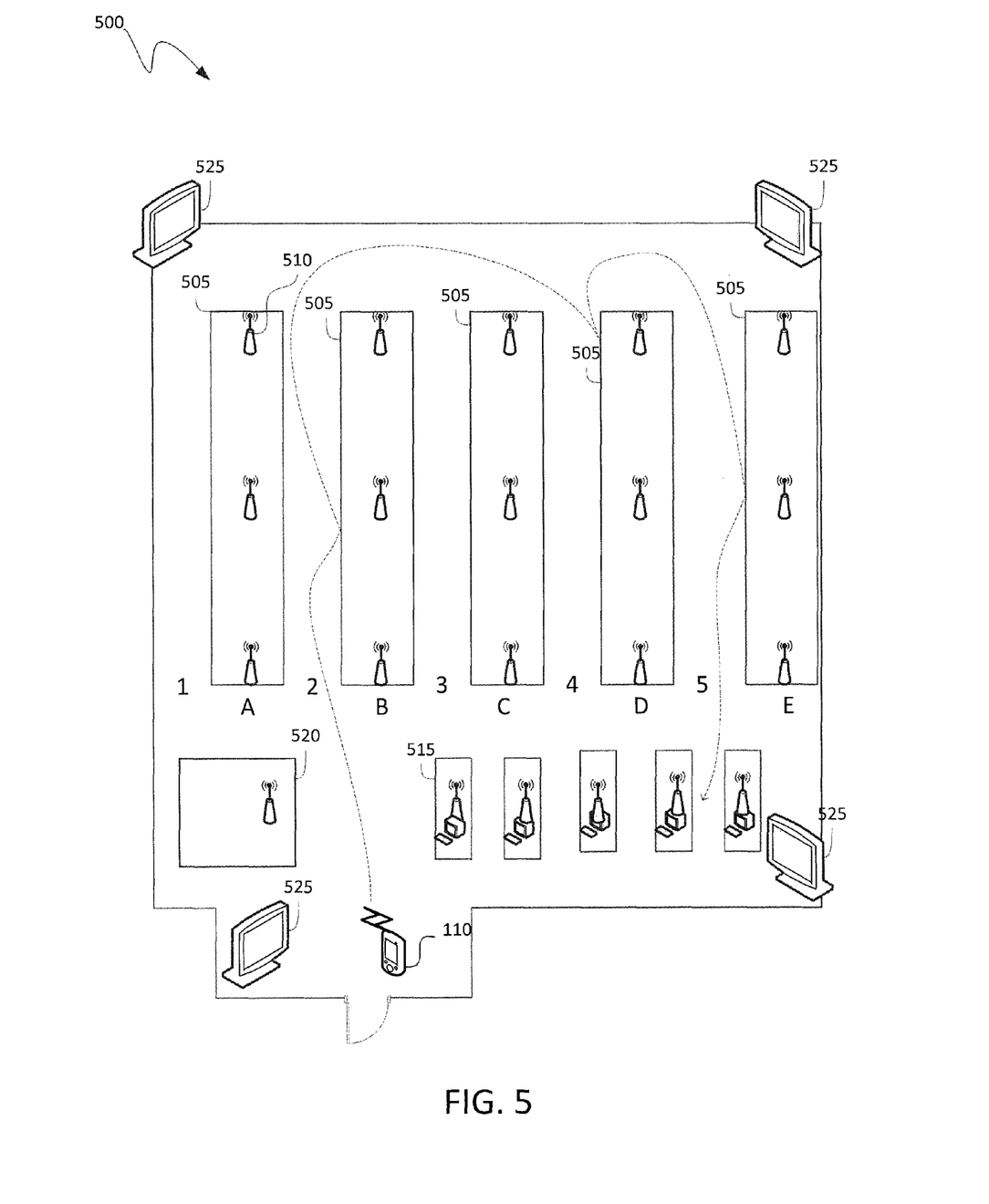
FIG. 5 is a diagram depicting a floor layout of a merchant store according to one embodiment.

At step 214, user device 110 or payment provider server 170 may receive layouts of the merchant's location, such as the store or venue of the merchant. The layout of the location may include locations of presentation devices in the store, such as display screen, audio output device, lighting, and the like. As shown in FIG. 5, as an example, the store layout of a grocery store may include various display screens 525. A display screen is installed near the entrance when customers enter and other display screens also are installed at each corner of the store.

Further, the layout of the location may include positions of detection devices configured to detect the presence or location of customers. For example, a network of Bluetooth Low Energy (BLE) beacons may be utilized to detect the presence, location, and/or movement of consumers in the store. The beacon layouts may be merged with their corresponding store layouts, such that the coordinate of each beacon in the beacon grid may be designated. For example, a network of Bluetooth beacons may be installed in the merchant's store. Each Bluetooth beacon may be installed at a specific location in the merchant's store and may emit low energy Bluetooth signals. Thus, a network of Bluetooth beacons may be formed in the merchant's store.

As shown in FIG. 5, as an example, the store layout of a grocery merchant may include shelves 505. Each shelf 505 in the store may have three Bluetooth beacons 510: one at the front section, one at the middle section, and one at the rear section. Each checkout counter 515 also may have a Bluetooth beacon 510. Further, one Bluetooth beacon 510 may be installed at a customer service counter 520 near the entrance of the store. The network of Bluetooth beacons 510 may be connected to merchant device 140. Each Bluetooth beacon 510 may emit a low energy Bluetooth signal with specific frequency spectrum. User 105 may carry a user device 110 including a Bluetooth device configured to communicate via low energy Bluetooth communication. When user 105 enters the merchant's store, user device 110 may detect Bluetooth beacons 510 installed near the store's entrance, such as the Bluetooth beacon 510 at customer service counter 520 and the Bluetooth beacon 510 at a checkout counter 515. Thus, the position of user device 110 may be determined based on which Bluetooth signals are received and the respective signal strength of the signals.

At step 216, the system may determine the presentation capabilities of the merchant location. In particular, the system may determine the composition, the types, the specification, and the locations of presentations available at the merchant location. For example, the merchant location may have three screen displays, located at the front of the store and audio speakers throughout the store. The system also may obtain specification of the presentation device, such as the type of operating system, the communication capability of the presentation device, the screen size, type of display, and the like. Thus, the system may determine whether the presentation device is capable of receiving and presenting customized advertisements.

At step 218, the system may generate a store presentation profile based on the above obtained information. The store presentation profile may include the merchant information, layout of the merchant location, available presentation devices, and the location and capability of the presentation devices in the merchant location. The system may use the store presentation profile to determine what type or style of advertisement information can be presented at the store. As such, the system may determine and communicate the appropriate type or style of advertisement information to the presentation devices at the merchant store to be displayed.

Accordingly, process 200 allows the system to collect user history based on which advertisements may be customized for the user. Process 210 allows the system to obtain or gather information regarding various merchant locations and the respective presentation devices installed at the merchant locations. In particular, the system may gather the number, composition, location, and specification of the available presentation devices in the store to generate a store presentation profile. The system may customize advertisements based on the store presentation profile.

Figure 3:
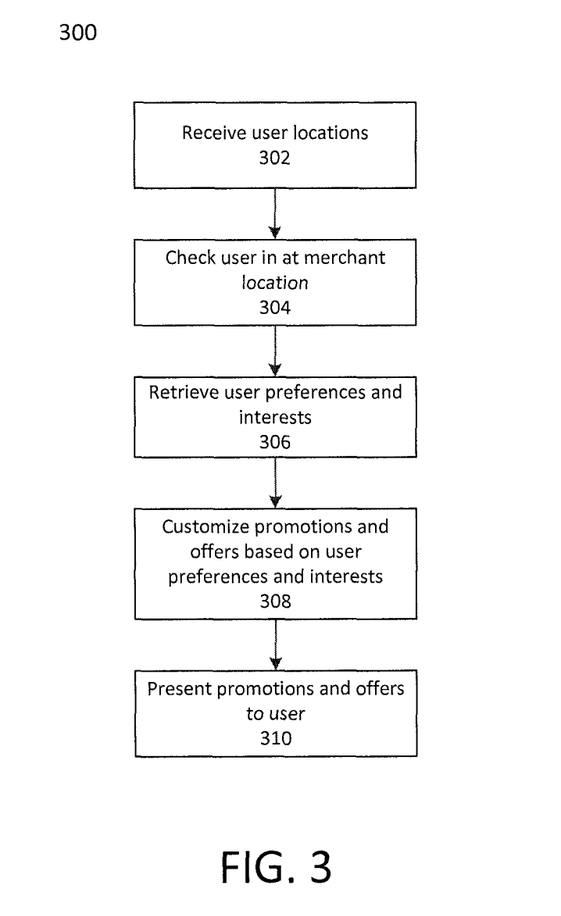
FIG. 3 is a flowchart showing a process for implementing in-store advertisement customization according to one embodiment.

FIG. 3 is a flowchart showing a process 300 for implementing in-store advertisement customization according to one embodiment. At step 302, the system may receive the user 105's location. In particular, the presence or location of the user device 110 may be detected or monitored when the user device 110 approaches or arrives at a merchant's location. In an embodiment, the GPS system on the user device 110 may detect that the use device 110 is approaching or near the merchant location. In an embodiment, the user device 110 may detected by a location detection device, such as a NFC device or a Bluetooth beacon installed at the merchant location.

At step 304, in response to detecting that the user 105 is at a merchant's location, the system may check in the user 105 at the merchant location. In some embodiments, the user 105 may automatically be checked in. In other embodiments, the system may ask the user 105 whether the user 105 wishes to be checked in at the merchant location. After the user 105 is checked in, the system may access and retrieve user account of the user 105. The user account may include interests and/or preferences of the user 105.

At step 306, the system may retrieve the user 105's preferences and interests. In particular, the system may access the user 105's account to retrieve the user 105's preferences and interests. The preferences and interests may indicate products, merchants, styles, categories, themes, and other preferences or interests of the user 105. For example, the preferences and interests may indicate the user 105's interest in certain sports or sports team, certain art or music style, particular product, and the like. The preferences or interests may have a time aspect, such as a constant or permanent interest, a seasonal interest or a temporary interest.

At step 308, the system may customize promotions and offers based on the user 105's preferences or interests. In an embodiment, the system may select promotions and/or offers related or associated with the merchant the user 105 is visiting. For example, the user 105 is visiting a hardware store. The system may select promotions and/or offers issued by the hardware store. In another example, the system may select promotions and/or offers issued from other similar hardware stores.

In some embodiments, the system may select promotions and/or offers issued from other nearby merchants based on the context of the visit. For example, the user 105 is visiting an apparel store near lunch time on a weekend. The system may then select promotions and/or offers from nearby restaurants that match the user 105's food or dinning preferences or interests. In another example, the user 105 is visiting a gift shop and the user 105's calendar indicates that the birthday of a family member is coming up. The system may then select promotions and/or offers related to birthday gifts/cards appropriate for the family member's age and interests.

In an embodiment, the preferences and/or interests may be weighted for customizing the promotions and/or offers based on the user 105's recent activities. In particular, the user 105's recent activities, such as online browsing history, shopping history, purchase history, and the like may be analyzed and used to customize the promotions and/or offers. For example, the user 105 is interested in purchasing a new refrigerator and has been browsing and researching various refrigerators online Based on these online browsing activities, the system may select and customize promotions and/or offers related to the type, style, and model of refrigerators the user 105 has been reviewing or browsing. As such, these promotions and offers may be presented to the user 105 when the user 105 visits a home appliance merchant location. This allows the user 105 to experience a seamless shopping experience between online and in-store shopping.

In an embodiment, the contents of the promotions and/or offers may be customized based on the user 105's personal information, preferences and/or interest. In particular, the user 105's name may be inserted in the text or audio output of the promotions and/or offers to better draw the user 105's attention. Further, the style of language and/or background music also may be customized based on the user 105's preferences and/or interests. The levels of promotions and/or offers also may be adjusted based on the user 105's preferences or interests. For example, the system may determine that the user 105 is very interested in purchasing children's gifts today because of the up-coming birthday of the user 105's child. As such, the system may provide greater discounts on the advertisements for children's gifts or toys. In another example, the user 105 may be a frequent shopper at the merchant. As such, the system may provide advertisements with better discounts to keep the user 105's business. As such, the system may customize the contents of offers and/or promotions differently based on different users. In still another example, the system may determine that the user 105 has very strong interest in purchasing a particular product based on the user 105's recent activities, such as online browsing history or search history. The system may adjust the price of the particular product displayed in the store when the user 105 is at the store to provide strong incentive for the user 105 to make the purchase.

In an embodiment, the promotions and/or offers may be customized based on the user 105's location and/or movement within the merchant's location. For example, the position of user device 110 may be determined based on the Bluetooth signals received at user device 110 using techniques, such as triangulation or location fingerprint. In the triangulation technique, the location of user device 110 may be determined based on the locations of three Bluetooth beacons 510 and the distance of user device 110 from the two or more Bluetooth beacons 510. The locations of the Bluetooth beacons 510 may be predetermined when the Bluetooth beacons 510 are installed on the shopping floor of the store. The distance between the Bluetooth beacons 510 and user device 110 may be determined based on the signal strength received between the Bluetooth beacons 510 and user device 110. A stronger signal may indicate a shorter distance while a weaker signal may indicate a longer distance. Thus, based on the Bluetooth signals between the Bluetooth beacons 510 and user device 110, the location of user device 110 may be determined using the triangulation technique.

Figure 6:
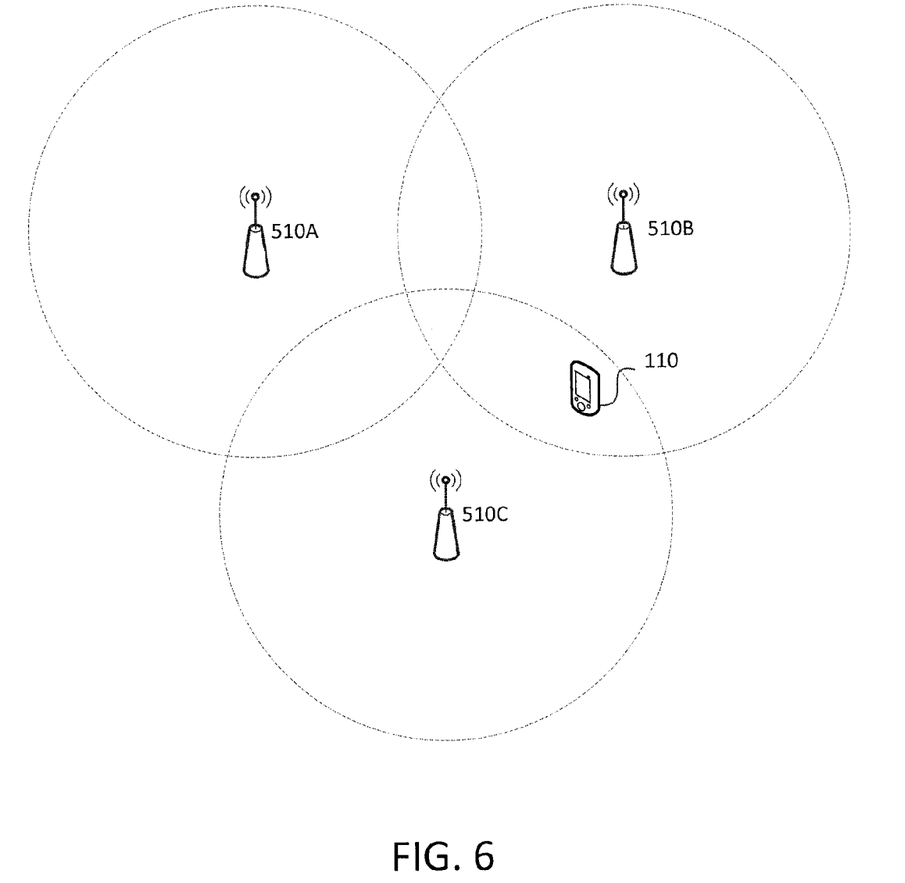
FIG. 6 is a diagram depicting a network of beacons according to one embodiment.

For example, as shown in FIG. 6, three Bluetooth beacons 510A, 510B, and 510C may each emit a unique Bluetooth signal. The signal range of each beacon may be illustrated as a circle of dashed line surrounding each beacon. As shown in FIG. 6, user device 110 may be located at a position at which user device 110 receives signals from beacon 510B and beacon 510C, but not beacon 510A. In particular, user device 110 receives signals with about the same signal strength from both beacons 510B and 510C. Thus, user device 110 is located between an area between beacons 510B and 510C, but away from 510A. Further, based on the signal strengths of the signals, the distance between user device 110 and beacons 510B and 510C may be determined. User device 110 or payment provider server 170 may analyze the signals and their signal strengths received at user device 110 and reference the locations of the beacons that emit these signals to determine the location of user device 110 by triangulation techniques.

In the location fingerprint technique, a database of signal fingerprints at various locations on the shopping floor may be predetermined. For example, a signal profile may be predetermined for each location. The signal profile may include Bluetooth signals that are detected at that location and the strength of each of those detected Bluetooth signals. For example, as shown in FIG. 6, when user device 110 is positioned at a certain position between beacons 510B and 510C, a signal profile may be predetermined to indicate medium signals from beacons 510B and 510C and low or no signal from beacon 510A. A database of signal profiles associated with a plurality of respective locations on the shopping floor may be predetermined and stored. Thus, based on a signal profile detected by user device 110, a location of user device 110 may be determined by referencing the database of signal profiles.

In some embodiments, the signal profile may be the Bluetooth signal of user device 110 received by respective Bluetooth beacons. For example, as shown in FIG. 6, when user device 110 is positioned between beacons 510B and 510C, a signal profile may be predetermined to indicate medium signals received by beacons 510B and 510C, and weak or no signal received at beacon 510A. Thus, the signal fingerprints may be signals received by user device 110 or signals received by the respective Bluetooth beacons 510.

The location of user device 110 may be determined by user device 110. For example, user device 110 may download a layout map of the merchant and may determine user device 110's position based on the Bluetooth signals detected and the floor layout of the Bluetooth beacons 510. In some embodiments, merchant device 140 may determine the location of user device 110 based on which Bluetooth beacons 510 detect user device 110 and the strength of the signal detected at the Bluetooth beacons 510. In some embodiments, the detected signals and signal strengths may be forwarded to payment provider server 170 and payment provider server 170 may determine the location of user device.

The system may determine the location of the user 105 and may customize the promotions and offers based on the user's location in the merchant's location. For example, the system may determine that the user is approaching the merchant's location, such as at the entrance or the front of the store. The system may then customize the promotions or offers to be displayed near the entrance or at the front of the merchant's location. In another example, the system may determine that the user is at a particular location in the merchant's location and may determine the type of products or services located near the user's location based on product placement layout map. The system may determine if any presentation devices are near that user's location. The system may select or customize advertisements for products or services that are near the user 105's location and are desired by the user 105 based on the user 105's preferences and interests.

In an embodiment, the system may customize the promotions or offers based on the types or capabilities of presentation devices available at the merchant's location. For example, the merchant's location may have different types of presentation devices, such as a display screen, an audio output device, a scroll display, and the like. The system may customize the advertisement into the appropriate format for the presentation device. For example, the system may customize the content of a promotion in image format for a screen display and may customize the content of the promotion in audio format for an audio output device. As such, the appropriate content format may be generated for the appropriate type of presentation device.

In an embodiment, the promotions and/or offers may be customized based on the preferences and/or interests of both the user 105 and the other users who are also visiting the merchant's location. In particular, multiple users may visit the merchant's location simultaneously. The system may check in the user 105 and the other users at the merchant store and may retrieve each user's preferences and interests. The system may consider preferences and interests from each user when customizing promotions or offers to be presented in the merchant's location.

In an embodiment, the system may select or customize promotions or offers based on popular and/or common interests or preferences among the different users who are visiting the merchant location. For example, ten people may be visiting the merchant's location. Five of them are interested in women's apparel, three of them are interested in men's shoes, and two of them are interested in children's apparel. The system may customize the advertisements to present more promotions or offers related to women's apparel, based on the popularity of women's apparel (5 out of 10 people). In some embodiments, the system may customize the advertisements to present promotions and/or offers of different interests with different frequency based on the popularity of different interests. In the same example, the system may select and present promotions and/or offers related to women's apparel five out of ten times, present promotions and/or offers related to men's shoes three out of ten times, and present promotions and/or offers related to children's apparel, two out of ten times. Thus, promotions and/or offers related to more popular interests are presented more frequently.

In an embodiment, the system may weigh each user's preferences or interests differently for customizing advertisements. In particular, more important users may be weighted more, such that the system may customize the advertisements to present promotions and/or offers more related to the important user's interests or preferences. In an example, an important user is a frequent customer or loyal customer who has shopped at the merchant location multiple times. In another example, an important user is a large spender who makes expensive purchases. In still another example, an important user is a first time customer, as such that the merchant may want to make a good impression. In an example, an important user has great social media connections and may be able to promote the merchant effectively. Thus, the system may customize the advertisements based on the importance of the users who are visiting the merchant location.

In an embodiment, the system may determine that there are other users near the presentation device and may refrain from presenting advertisements including private or personal information of the user 105. This may protect the privacy of the user 105.

In an embodiment, the system may customize the advertisements to remove certain content that are inappropriate or offensive to customers who are visiting the merchant's location. For example, the system may customize the advertisements based on the user's demographics or background. For example, the user's age may be used to customize the advertisements to prevent or remove promotions and/or offers that are not age appropriate. In another example, the system may customize the advertisements based on the user's cultural or religious background to remove promotions and/or offers that are inappropriate or offensive to the user's cultural or religious background.

At step 310, the system may present the promotions and/or offers to the user 105. In particular, the system may present the customized promotions and/or offers to the user 105 based on the types, capabilities, and/or locations of presentation devices available at the merchant location. The content or information for the customized promotions and/or offers may be communicated to the presentation devices from the merchant server 140, the user device 110, and/or the payment provider server 180. For example, the user device 110 may customize advertisements and communicate them via WiFi, Bluetooth, and/or NFC to nearby presentation devices. In another example, the merchant server 140 or the payment provider server 170 may detect the user 105's location and may communicate information related to the customized advertisements to presentation devices located near the user 105. The merchant location may have multiple presentation devices located at different areas of the merchant location. Different presentation devices may present different customized advertisements to different users simultaneously based on the different users' respective locations in the merchant location.

The customized advertisements may provide users with personalized in-store shopping experience. The customized advertisements may be displayed to the users via display screens in the store. In some embodiments, the presentation devices include audio output devices that output audio recordings of advertisements. The audio output devices also may play certain style or genre of music or recordings based on the user's preferences or interests. In an embodiment, the presentation device may include a scent making device, such as fragrance emitter or the like, that may emit different scents or fragrance based on the user's preferences or interest. The presentation device also may include various types if visual or audio displaying device, such as color lighting, dimming device, and the like that may modify the overall look and feel of the store based on the user's preferences or interests. As such, the overall theme of the store may be customized and modified based on the user's preferences or interests. When the user is with other users, either known or unknown, the system may determine an item of interest common to the group, such that the advertisement may be of interest to the entire group, thereby maximizing the number of potential customers affected. These group advertisements may be presented at any location within or outside a merchant, where the advertisement may be further dependent on the section or aisle having a particular type or group of items for sale. Alternatively, an advertisement to the group can be focused on a subset of the group (such as a more important customer or customers) at the expense of others in the group (who may be first time shoppers or shoppers not typically interested in items at the particular store location).

The above processes 200, 210, and 300 may be executed by user device 110. In some embodiments, the processes 200, 210, and 300 may be executed at merchant device 140 or payment provider server 170. In some other embodiments, above processes 200, 300, and 320 may be executed by one or more of user device 110, merchant device 140, and payment provider server 170 in coordination with each other.

Figure 4:
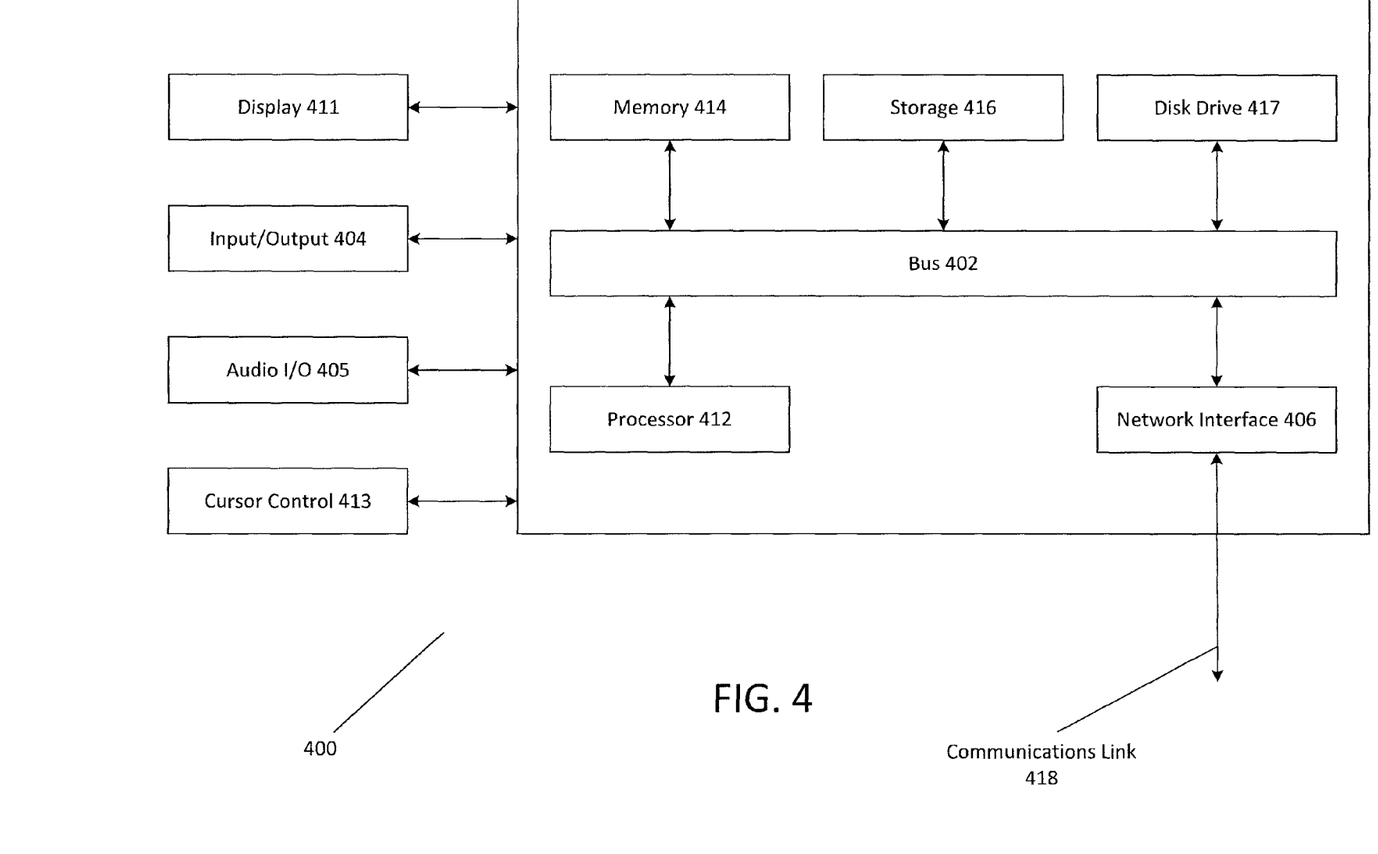
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 160. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    a non-transitory memory; and
    one or more hardware processors coupled to the non-transitory memory and configured to read instructions from the non-transitory memory to cause the system to perform operations comprising:
        determining that a user is at a merchant location by detecting a location of a communication device of the user at the merchant location;
        determining that one or more other users are at the merchant location at a same time as the user by detecting one or more devices corresponding to the one or more other users at the merchant location;
        retrieving user preferences of the user and the one or more other users;
        customizing an advertisement based on the user preferences of the user and the one or more other users;
        determining that at least one of the user and the one or more other users have an age restriction based on the user preferences;
        in response to determining that at least one of the user and the one or more other users have an age restriction, removing content based on the age restriction from the advertisement; and
        communicating information for presenting the advertisement to the user and the one or more other users to a presentation device different from the communication device of the user at the merchant location.

2. The system of claim 1, wherein the user preferences comprise one or more of a purchase history, a shopping history, a browsing history, an electronic communication, a calendar, a schedule, and user attributes.

3. The system of claim 1, wherein the operations further comprise:
    monitoring the location of the user using a network of Bluetooth beacons installed at the merchant location; and
    selecting a presentation device based on the location of the user for presenting the advertisement to the user.

4. The system of claim 1, wherein the presentation device is one or more of a display screen, an audio output device, a scent emitting device, or a lighting device.

5. The system of claim 1, wherein the advertisement is customized based on a type and a capability of the presentation device.

6. The system of claim 1, wherein the advertisement is customized based on one or more of a time of day, a day of week, or a season of year.

7. The system of claim 1, wherein the operations further comprise customizing a content of the advertisement based on personal information of the user.

8. A method comprising:
    determining, by a hardware processor, that a user is at a merchant location by detecting a location of a communication device of the user at the merchant location;
    determining, by the hardware processor, that one or more users are at the merchant location at a same time as the user by detecting one or more devices corresponding to the one or more users at the merchant location;
    retrieving, by the hardware processor, user preferences of the user and the one or more other users;
    customizing, by the hardware processor, an advertisement based on the user preferences of the user and the one or more other users;
    determining, by the hardware processor, that at least one of the user and the one or more other users have an age restriction based on the user preferences;
    in response to determining that at least one of the user and the one or more other users have an age restriction, removing content based on the age restriction from the advertisement; and
    communicating, by the hardware processor, information for presenting the advertisement to the user and the one or more other users to a presentation device installed at the merchant location.

9. The method of claim 8, wherein the location of the communication device is detected via a network of Bluetooth beacons and determined by triangulation technique or by location fingerprint technique.

10. The method of claim 8, further comprising customizing a promotion level in the advertisement based on the user preferences.

11. The method of claim 8, further comprising: customizing the advertisement based on user preferences that are common to the user and the one or more other users.

12. The method of claim 11, further comprising customizing the advertisement based on the user preferences that correspond to a largest number of users among the user and the one or more other users.

13. The method of claim 11, further comprising:
    weighing the user preferences of the user and the one or more other users based on a purchase history of each user; and
    customizing the advertisement based on the weighted user preferences such that advertisements corresponding to users with more extensive purchase history are presented more frequently.

14. The method of claim 13, wherein the purchase history comprises a purchase amount history, a purchase frequency, and a first time visit at the merchant location.

15. The method of claim 13, further comprising customizing the advertisement based on a location of the user in the merchant location and products or services near the location of the user.

16. The method of claim 13, further comprising customizing the advertisement based on an age of the user.

17. The method of claim 13, further comprising removing content from the advertisement based on a cultural or religious background of the user.

18. A non-transitory machine-readable medium having stored thereon machine-readable instructions executable to cause a machine to perform operations comprising:

determining that a user is at a merchant location by detecting a location of a communication device of the user at the merchant location;

determining that one or more other users are at the merchant location at a same time as the user by detecting one or more devices corresponding to the one or more other users at the merchant location;

checking in the user and the one or more other users at the merchant location;

retrieving user preferences of the user and the one or more other users;

customizing an advertisement based on the user preferences of the user and the one or more other users;

determining that at least one of the user and the one or more other users have an age restriction based on the user preferences;

in response to determining that at least one of the user and the one or more other users have an age restriction, removing content based on the age restriction from the advertisement; and     communicating information for presenting the advertisement to the user and the one or more other users to a presentation device installed at the merchant location.

19. The non-transitory machine-readable medium of claim 18, wherein the operations further comprise:

monitoring user interactions;

collecting user history including one or more of a purchase history, a shopping history, a browsing history, an electronic communication history, a calendar, and a schedule; and     determining the user preferences based on the user history.

20. The non-transitory machine-readable medium of claim 18, wherein the operations further comprise:

receiving a layout of the merchant location;

determining presentation capabilities of the merchant location based on availability of one or more presentation devices at the merchant location; and     generating a store presentation profile for the merchant location.

\* \* \* \* \*